(12) United States Patent
Bachl et al.

(10) Patent No.: US 7,080,946 B2
(45) Date of Patent: Jul. 25, 2006

(54) ELECTRO-OPTICAL DEVICE FOR COUPLING LIGHT-SIGNALS INTO A WAVEGUIDE

(75) Inventors: Bernhard Bachl, Falkensee (DE); Peter Brockhaus, Berlin (DE)

(73) Assignee: EZconn Corporation, Taipei (TW)

(*) Notice: Subject to any disclaimer, the term of this patent is extended or adjusted under 35 U.S.C. 154(b) by 0 days.

(21) Appl. No.: 10/962,282

(22) Filed: Oct. 8, 2004

(65) Prior Publication Data
US 2006/0078255 A1    Apr. 13, 2006

(51) Int. Cl.
*G02B 6/42* (2006.01)
(52) U.S. Cl. ....................................................... 385/93
(58) Field of Classification Search .................. 385/93
See application file for complete search history.

(56) References Cited

U.S. PATENT DOCUMENTS 5,011,247 A * 4/1991 Boudreau et al. ............. 385/33
2004/0184744 A1* 9/2004 Uekawa ....................... 385/93

* cited by examiner

*Primary Examiner*—Michelle Connelly-Cushwa
*Assistant Examiner*—Jerry T Rahll
(74) *Attorney, Agent, or Firm*—Baker Botts L.L.P.

(57) ABSTRACT

The invention relates to an electro-optical arrangement for coupling light signals into an optical waveguide, which has a laser diode for emitting light signals and a microlens, which focuses light signals emitted by the laser for coupling into the optical waveguide. According to the invention, the microlens is arranged on a carrier carrying the laser diode.

20 Claims, 3 Drawing Sheets

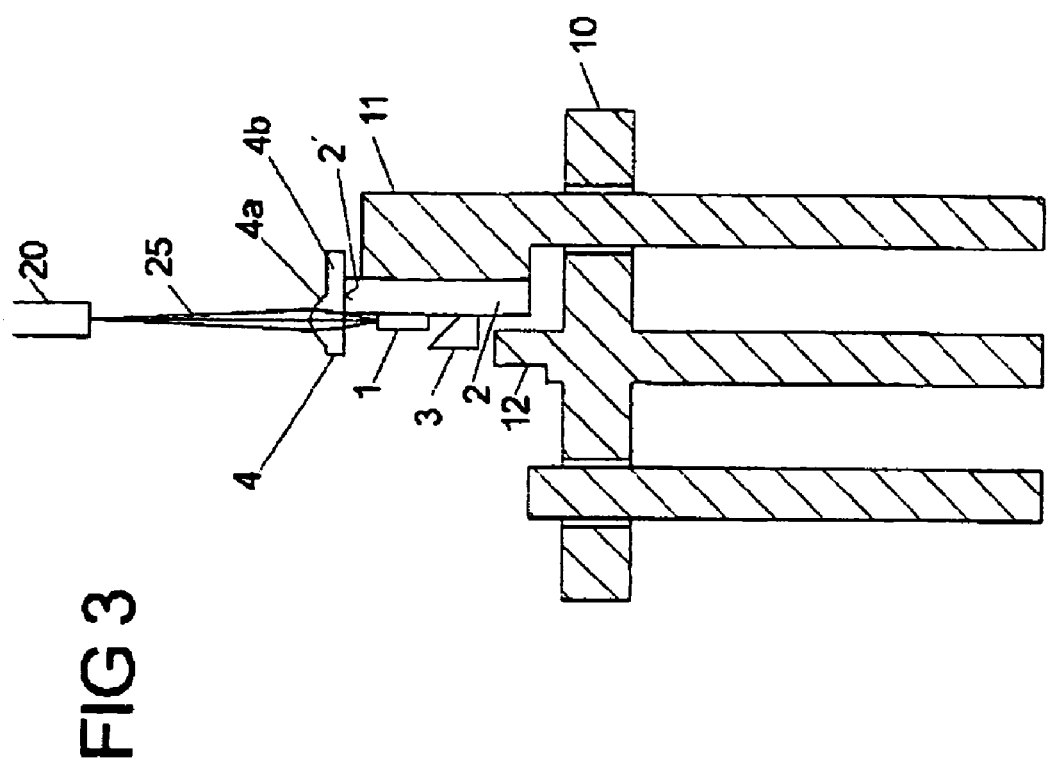

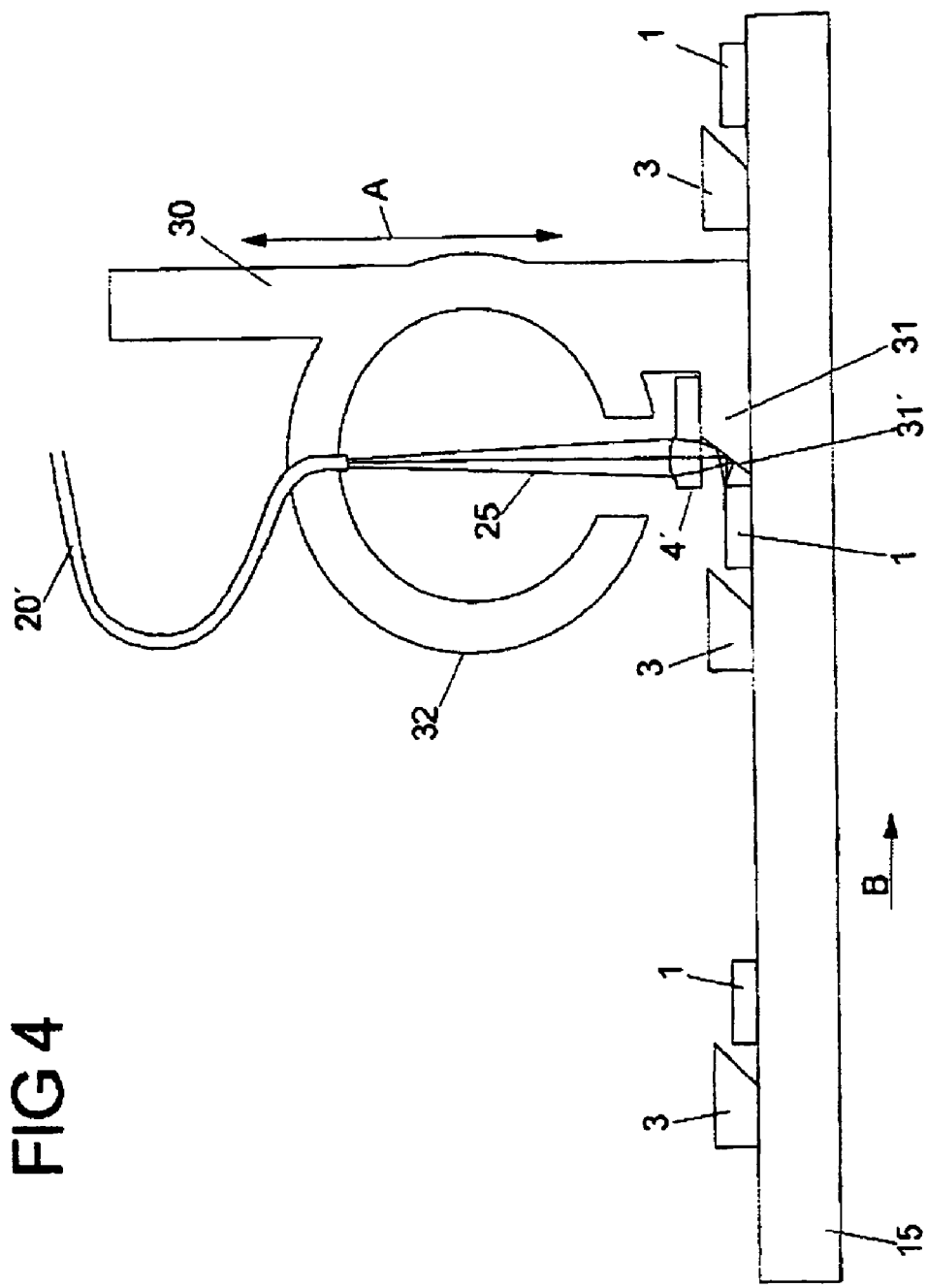

ELECTRO-OPTICAL DEVICE FOR COUPLING LIGHT-SIGNALS INTO A WAVEGUIDE

Electro-optical arrangement for coupling light signals into an optical waveguide.

FIELD OF THE INVENTION

The invention relates to an electro-optical arrangement for coupling light signals into an optical waveguide, in particular around an electro-optical micromodule arrangement that is employed in the field of micro-module technology.

BACKGROUND OF THE INVENTION

Commercially available arrangements for coupling light signals into an optical waveguide have a laser diode for emitting light signals, and also a microlens, which focuses light signals emitted by the laser for coupling into the optical waveguide. In order to obtain high transmission rates and a high coupling efficiency, such micromodules usually make use of edge emitting lasers that emit light signals parallel to the surface on which they are fitted.

In order to enable coupling into an optical waveguide in a vertical direction, the light signals of the edge emitting laser are deflected from a horizontal direction into a vertical direction through a prism arranged in the emission direction of the laser. A microlens is arranged and fixed on the prism such that its imaging region is arranged in the beam path of the light signals deflected by the prism. The light signals are focused by the microlens and coupled into an optical waveguide.

There is a need for an electro-optical arrangement for coupling light signals into an optical waveguide which, given the same transmission quality, is more cost-effective than the arrangements known hitherto.

SUMMARY OF THE INVENTION

According to the present invention, the electro-optical arrangement has a laser diode and a microlens. In this case, the microlens is arranged directly on a carrier carrying the laser diode. The functions of the carrier are thus extended in that it carries not only the laser diode but also the microlens. In this case, the term carrier is to be understood to mean that the carrier carries the weight of the laser diode. In this case, the laser diode is arranged either on the carrier itself or on an intermediate carrier fixed to the actual carrier such that the carrier carries the weight of the laser diode by way of the intermediate carrier.

The use of additional components for carrying the microlens, such as an expensive prism, for example, are thus superfluous. As a result, costs for components which have hitherto carried the microlens are saved, on the one hand, and the electro-optical arrangement also becomes more compact and clearer in its configuration, on the other hand. This is important in particular for keeping compact the construction of a micromodule in which a plurality of functions are integrated in one module.

Preferably, the microlens is carried by the carrier and/or is fixed to the carrier. The microlens may also be formed in one piece with the carrier.

In a preferred embodiment, the microlens has an imaging region for focusing light signals and also a fixing region, by means of which the microlens is fixed to the carrier. Therefore, as long as the imaging region lies in the beam path of the light signals emitted by the laser diode, the fixing region can bear completely on the carrier and form a force-locking connection with it without reducing the imaging quality. In this case, it is unnecessary to fix the microlens to the imaging region in itself since the microlens is already fixed to the fixing region.

In one refinement, the carrier is formed either in semiconducting fashion or in conductive fashion. By way of example, silicon forms a customary carrier material for a laser diode, so that this material also serves for taking up a microlens. The microlens can be soldered or adhesively bonded by its uptake region to such a stable material of the carrier.

In a particularly preferred embodiment, the laser diode is oriented in relation to the microlens in such a way that light signals emitted by the laser diode propagate rectilinearly from the laser diode to the microlens. Deflection means such as a prism, for example, are not required in this case, but rather are obviated. In this case, it is advantageous, in particular, if the direction in which the laser emits light signals corresponds to the direction in which the light signals are coupled into the optical waveguide. Consequently, the beam course from the laser diode up to the optical waveguide is essentially rectilinear, the light signals being focused by the microlens arranged in between. As an alternative, the beam course from the laser diode up to the optical waveguide may also be formed in angular fashion, so that the microlens focuses the light signals at a squint angle.

As an alternative to a soldered connection, the microlens may be adhesively bonded onto the carrier.

Preferably, a free-radiating region is formed between the laser diode and the microlens, in particular in the case of TO housings.

The laser diode is particularly preferably formed as an edge emitting laser since transmission ranges of more than 10 km can be achieved with these lasers. The coupling efficiency of such edge emitting lasers is up to 50% in the case of a spherical microlens, and up to 80% in the case of an aspherical microlens. This holds true in the case where the optical waveguide is formed as a single-mode fiber.

In one embodiment, the laser diode is arranged on a laser carrier plate such that light signals emitted by the laser diode propagate essentially parallel to the laser carrier plate. This arrangement is advantageous particularly in the case of edge emitting lasers. By way of example, a submount made of silicon serves as the laser carrier plate.

In an alternative refinement, the laser diode is arranged on the laser carrier plate such that light beams emitted by the laser diode propagate in part obliquely in a targeted manner with respect to the laser carrier plate.

In this case, the laser carrier plate is advantageously oriented in an essentially vertical plane. The orientation of the emission direction of the laser diode is thus controlled and defined by means of the arrangement of the laser carrier plate on which the laser diode is fixed and with which the laser diode forms a module.

In a particular preferred refinement, the laser carrier plate is arranged with the laser in a TO housing, to be precise on a vertically extending region of a TO pin. In this case, the TO pin carries the laser carrier plate and thus the laser diode. In this refinement, the microlens is preferably fixed to the TO pin to which the laser carrier plate is also fixed. For this purpose, the TO pin is preferably extended further than the laser carrier plate in the emission direction, in which the laser diode emits light signals. As a result, the microlens can be fixed conveniently on the TO pin by means of a fixing section.

The emission direction of the laser diode is advantageously essentially vertical. If the coupling-in direction into the optical waveguide is likewise vertical, then a deflection of the emitted light signals is unnecessary and the use of deflection components such as prisms or mirrors is superfluous.

In this case, the microlens is preferably arranged in a horizontal arrangement on the flat end of the TO pin, so that it focuses light signals emitted by the laser diode.

BRIEF DESCRIPTION OF THE DRAWINGS

The invention is explained in more detail below on the basis of exemplary embodiments shown in the figures, in which:

FIG. 3 shows an electro-optical arrangement with a microlens applied on an enlarged laser carrier plate, in a schematic, lateral sectional illustration; and FIG. 4 shows a construction for testing a multiplicity of edge emitting lasers at the panel level.

DESCRIPTION OF A PLURALITY OF PREFERRED EXEMPLARY EMBODIMENTS

In the figures, mutually corresponding or similar features have the same reference symbols.

Figure 1:
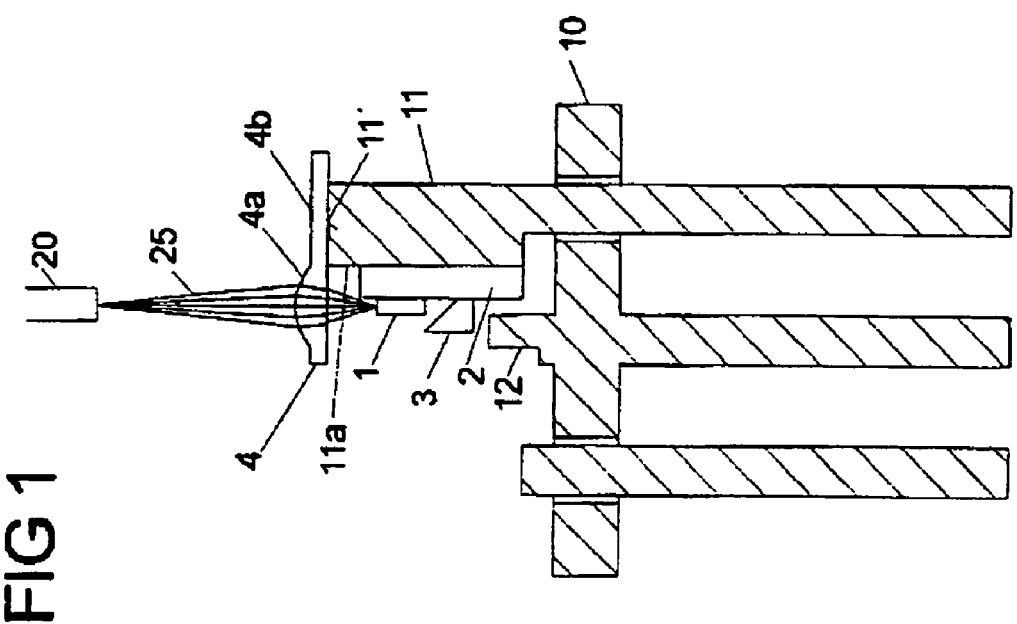
FIG. 1 shows an electro-optical arrangement with an edge emitting laser in vertical orientation in a schematic, lateral sectional illustration.

FIG. 1 shows a micromodule of TO design in a schematic, lateral sectional illustration. The micromodule represents an electro-optical arrangement, the basic carrier or baseplate of which is formed as a TO header 10 (TO in this case denotes transistor outline). A commercially available DC laser header, for example a TO-46 header, serves as the TO header 10 in this case. The basic plane of the TO header 10 is oriented horizontally, a plurality of pins 11 and 12 extending in the vertical direction with respect to this horizontal plane.

A TO pin 11 has a larger extent than the remaining pins 12 and extends in the vertical direction right into the TO housing. In this case, the TO pin 11 has an essentially parallelepipedal form in the region situated in the TO housing. A laser carrier plate 2 is arranged on one of its side areas 11a, which faces the center point of the TO header 10. The laser carrier plate 2 is fixed at its underside to the vertically oriented side area 11a of the TO pin 11, for which reason the laser carrier plate 2 is also oriented essentially vertically. The laser carrier plate 2 is composed of silicon, for example, and serves as a submount. Both an edge emitting laser 1 as laser diode and an angular monitor diode 3 are arranged on that side of the laser carrier plate 2 which is remote from the TO pin 11. By means of reflection light of the laser 1 that is registered by the angular monitor diode 3, the light signals emitted by the laser 1 are registered and forwarded for further processing. The angular monitor diode 3 registers only a small fraction of the light emitted by the laser 1. The emission power is emitted from the laser 1 almost exclusively in the emission direction.

The edge emitting laser 1 is arranged on the laser carrier plate 2 such that its emission direction is oriented essentially parallel to the laser carrier plate 2 and thus also to the TO pin 11. Moreover, the emission direction is oriented toward an optical waveguide 20, for which reason the edge emitting laser 1 emits light signals in a direction that leads away vertically from the base area of the TO header 10.

The laser 1 emits light signals 25, which are coupled into the optical waveguide 20. By way of example, a single-mode fiber serves as optical waveguide 20. A microlens 4 is arranged in the beam path between the laser 1 and the optical waveguide 20 and thus in the rectilinear connecting direction thereof. The microlens 4 serves for focusing the light signals 25 in order that the latter can be coupled into the optical waveguide 20. As an alternative to this orientation, the microlens 4 could also be oriented such that it couples the light signals into the optical waveguide 20 at a squint angle.

The microlens 4 comprises two regions, firstly the imaging region 4a with a lenticular surface for imaging light beams, and secondly the fixing region 4b, which constitutes a lengthening of the microlens 4 beyond the imaging region 4a. The fixing region 4b does not have a lentoid curvature and therefore is also not suitable for imaging light beams.

The microlens 4 has a planar basic form arranged perpendicular to the beam path of the light signals 25 in order to obtain the highest possible imaging quality. In this case, the fixing region 4b of the microlens 4 is fixed on the top side 11' of the TO pin 11, such that the imaging region 4a of the microlens 4 projects beyond the TO pin 11 and into the beam path of the light signals 25. The fixing region 4b of the microlens 4 is soldered onto a flattened, gold-coated area 11' of the TO pin 11. The plane on the TO pin 11 is produced by crimping. If appropriate, the TO pin 11 must be leveled again prior to gold-plating.

As an alternative to this, the lens may be adhesively bonded onto the TO pin 11. The connection between the laser carrier plate 2 and the TO pin 11 also comprises an adhesive-bonding connection.

Intermediate layers, for example a further submount or an insulator, for example made of glass, may be fitted between the TO pin 11 and the laser carrier plate 2. An insulator prevents the situation in which, as the microlens 4 is being mounted onto the TO pin 11, soldering heat passes via the laser carrier plate 2 to the laser 1 or other components on the laser carrier plate 2 and damages the latter.

Figure 2:
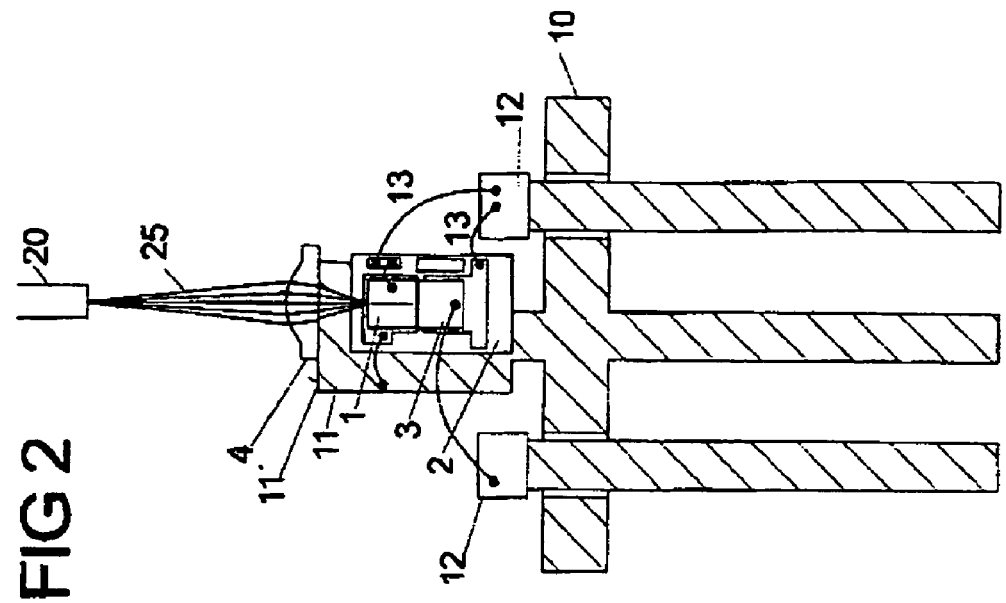
FIG. 2 shows the electro-optical arrangement of FIG. 1 in a further side view.

FIG. 2 illustrates the electro-optical arrangement of FIG. 1 in a second schematic view, which is pivoted through 90° relative to the view of FIG. 1. The monitor diode 3 and also the laser 1 are electrically connected via bonding wires 13 to the TO pin 11 and the further pins 12. In this case, the bonding wires 13 run either between the electro-optical components and the pins themselves or else over the laser carrier plate 2.

From the perspective of FIG. 2 as well, the microlens 4 is arranged essentially vertically above the laser 1 such that it is situated in the rectilinear connecting line between the laser 1 and the optical waveguide 20 and focuses the light signals 25. In this case, then, it is not critical whether the microlens and/or the laser carrier plate 2 are arranged as far as possible centrally or symmetrically or vertically on the TO pin 11. What is critical is that the emission direction of the laser corresponds to the direction in which the light signals 25 are coupled into the optical waveguide 25. Before the microlens 4 is fixed to the surface 11' of the TO pin 11, the microlens 4 is adjusted in such a way as to maximize the coupling efficiency of the light signals 25 when they are coupled into the optical waveguide 20.

Both FIG. 1 and FIG. 2 reveal that the TO pin 11 has a higher extent in the vertical direction than the laser carrier plate 2, that is to say projects beyond the latter. By regulating this difference in extent, the distance between the microlens 4 and the laser 1 also changes at the same time, by way of which the distance between the focal lens and the point with the optimized coupling properties for coupling into the optical waveguide 20 is also dependent and can be optimized.

FIG. 3 shows an alternative embodiment of an electro-optical arrangement in the form of a micromodule. The electro-optical arrangement largely corresponds to the arrangement of FIG. 1. In contrast to the electro-optical arrangement in FIG. 1, however, the laser carrier plate 2 has a larger extent than the TO pin 11 in the vertical direction. The fixing region 4b of the microlens 4 is fixed on the top side 2' of the laser carrier plate 2, and not on the TO pin 11 for instance. The imaging region 4a of the microlens 4 is arranged within the beam path of the light signals 25 in the rectilinear connection between laser 1 and the optical waveguide 20.

In the embodiment of FIG. 3, the microlens 4 is thus arranged on the direct carrier of the laser diode 1, namely the laser carrier plate 2. In the embodiment of FIGS. 1 and 2, the microlens 4 is arranged on the TO pin 11 as carrier which carries the laser diode 1 by way of the laser carrier plate 2.

FIG. 4 shows that sampling at the panel level or a wafer burn-in is also possible in the case of the prismless electro-optical arrangement according to the invention. A plurality of pairs of edge emitting lasers 1 and monitor diodes 3 are mounted jointly on the panel 15 such that the emission direction of the edge emitting laser 1 runs parallel to the surface of the panel 15. A plunger 30 is arranged in a movable manner along the arrow A such that it can be moved between a lowered and raised position. In the lowered position illustrated in FIG. 4, the underside of the plunger 30 bears on the panel 15. A deflection prism 31 is formed on the underside of the plunger 30 such that a reflecting surface 31' of the deflection prism 31 is arranged in a manner inclined at 45° in the beam path of the light signals 25 emitted by the edge emitting laser 1, so that the light signals 25 are deflected by 90°. Prior to deflection at the deflection prism 31, the light signals 25 run essentially parallel to the panel 15. After reflection at the reflecting surface 31', they run in a vertical direction formed essentially perpendicular to the panel 15.

The light signals 25 are coupled into an optical waveguide 20', which is likewise oriented perpendicular to the surface of the panel 15, after they are focused by a microlens 4' and have passed through an integrated sphere 32. In this case, the lens 4' is fixed on the deflection prism 31 such that its imaging region is arranged in the beam path of the light signals 25. Instead of using a deflection prism for each individual laser, the deflection prism serving for deflection and for holding the microlens, for each individual laser, only one deflection prism 31 is used for the plunger 30. The optical waveguide 20' leads to a spectrum analyser that analyses and checks the emitted light signals 25. After sampling of a laser 1, the plunger 30 is raised perpendicular to the panel 15, the panel 15 is displaced along the arrow B in a direction running perpendicular to the direction of movement of the plunger 30, and the plunger 30 is lowered onto the panel 15 again in front of the next laser 1.

This method makes it possible to sample all the lasers 1 at the panel level without each individual laser having to have its own deflection prism 31. The deflection prism 31 thus moves up and down together with the plunger 30 perpendicular to the panel 15.

The sampling at the panel level may also be effected in two steps instead of using a plunger with an integrated sphere: in that case, in a first step, the characteristic curves are recorded with the aid of a large-area detector, and afterward, in a second step, the wavelength is measured by means of a multimode fiber. These two measurements can be performed all at once using a plunger with an integrated sphere.

The exemplary embodiments of the TO micromodules shown can be used for example in TOSAs (Transmission Optical Subassembly), ROSAs (Receiver Optical Subassembly) and BIDIs (Bidirectionals).

List of Reference Symbols

| | |
|---|---|
| 1 | Laser diode |
| 2 | Laser carrier plate |
| 2' | Top side of the laser carrier plate |
| 3 | Monitor diode |
| 4 | Microlens |
| 4' | Microlens |
| 4a | Imaging region |
| 4b | Fixing region |
| 10 | TO header |
| 11 | TO pin |
| 11' | Top side of the TO pin |
| 12 | Further pins |
| 13 | Bonding wires |
| 15 | Panel |
| 20 | Optical waveguide |
| 20' | Optical waveguide |
| 25 | Light signals |
| 30 | Plunger |
| 31 | Deflection prism |
| 31' | Reflecting surface |
| 32 | Integrated sphere |

The invention claimed is:

1. An electro-optical arrangement for coupling light signals into an optical waveguide, the electro-optical arrangement comprising:
a carrier plate coupled to a TO pin of a TO housing;
a laser diode for emitting light signals, wherein the laser diode is coupled to the carrier plate; and
a microlens arranged to focus the light signals emitted by the laser diode into an optical waveguide;
wherein the TO pin extends farther than the carrier plate in an emission direction of the light signals and the microlens is coupled to an end of the TO pin.

2. The electro-optical arrangement according to claim 1, wherein the laser diode is coupled to the carrier plate such that light signals emitted by the laser diode propagate essentially parallel to the carrier plate.

3. The electro-optical arrangement according to claim 2, wherein the carrier plate is oriented in an essentially vertical plane.

4. The electro-optical arrangement according to claim 1, wherein the carrier plate is comprised of a semiconductor.

5. The electro-optical arrangement according to claim 1, wherein the carrier plate is comprised of a conductive material.

6. The electro-optical arrangement according to claim 1, wherein the laser diode is oriented in relation to the microlens such that the light signals emitted by the laser diode propagate rectilinearly from the laser diode to the microlens.

7. The electro-optical arrangement according to claim 1, wherein the laser diode is oriented such that the light signals emitted by the laser diode are associated with a coupling-in direction, wherein the light signals are coupled into the optical waveguide.

8. The electro-optical arrangement according to claim 1, wherein the laser diode is coupled to the carrier plate or to an intermediate carrier that is coupled to the carrier plate.

9. The electro-optical arrangement according to claim 1, wherein the microlens is adhesively bonded to the TO pin.

10. The electro-optical arrangement according to claim 1, wherein the microlens is soldered to the TO pin.

11. The electro-optical arrangement according to claim 1, wherein a free-radiating region is formed between the laser diode and the microlens.

12. The electro-optical arrangement according to claim 1, wherein the laser diode comprises an edge emitting laser.

13. The electro-optical arrangement according to claim 1, wherein the microlens comprises an imaging region for focusing the light signals and a fixing region, wherein the microlens is coupled to the TO pin in the fixing region.

14. An electro-optical arrangement for coupling light signals into an optical waveguide, the electro-optical arrangement comprising:
   a carrier plate coupled to a TO pin of a TO housing;
   an edge emitting laser for emitting light signals, wherein the edge emitting laser is coupled to the carrier plate; and
   a microlens arranged to focus the light signals emitted by the edge emitting laser into an optical waveguide;
   wherein:
      the TO pin extends farther than the carrier plate in an emission direction of the light signals and the microlens is coupled to an end of the TO pin;
      the edge emitting laser is oriented in relation to the microlens such that a free-radiating region is formed between the edge emitting laser and the microlens, and the light signals emitted by the edge emitting laser propagate rectilinearly from the edge emitting laser to the microlens.

15. The electro-optical arrangement according to claim 14, wherein the edge emitting laser is coupled to the carrier plate such that light signals emitted by the edge emitting laser propagate essentially parallel to the carrier plate, which is oriented in an essentially vertical plane.

16. An electro-optical arrangement for coupling light signals into an optical waveguide, the electro-optical arrangement comprising:
   a carrier plate coupled to a TO pin of a TO housing;
   a laser diode for emitting light signals, wherein the laser diode is coupled to the carrier plate; and
   a microlens arranged to focus the light signals emitted by the laser diode into an optical waveguide;
   wherein the carrier plate extends farther than the TO pin in an emission direction of the light signals and the microlens is coupled to an end of the carrier plate.

17. The electro-optical arrangement according to claim 16, wherein the laser diode comprises an edge emitting laser.

18. The electro-optical arrangement according to claim 16, wherein the laser diode is coupled to the carrier plate such that light signals emitted by the laser diode propagate essentially parallel to the carrier plate.

19. The electro-optical arrangement according to claim 16, wherein the laser diode is oriented in relation to the microlens such that the light signals emitted by the laser diode propagate rectilinearly from the laser diode to the microlens.

20. The electro-optical arrangement according to claim 16, wherein a free-radiating region is formed between the laser diode and the microlens.

* * * * *